US010572278B2

(12) United States Patent
Klemenz (10) Patent No.: US 10,572,278 B2
(45) Date of Patent: Feb. 25, 2020

(54) SMART CONTROLS FOR USER INTERFACE DESIGN AND IMPLEMENTATION

(71) Applicant: SAP SE, Walldorf (DE)

(72) Inventor: Oliver Klemenz, Sinsheim (DE)

(73) Assignee: SAP SE, Walldorf (DE)

( * ) Notice: Subject to any disclaimer, the term of this patent is extended or adjusted under 35 U.S.C. 154(b) by 324 days.

(21) Appl. No.: 15/589,541

(22) Filed: May 8, 2017

(65) Prior Publication Data

US 2018/0321831 A1  Nov. 8, 2018

(51) Int. Cl.
| | | |
|---|---|---|
| *G06F 9/451* | (2018.01) | |
| *G06F 9/44* | (2018.01) | |
| *G06F 8/35* | (2018.01) | |
| *G06F 8/36* | (2018.01) | |

(52) U.S. Cl.
CPC .............. *G06F 9/451* (2018.02); *G06F 8/35* (2013.01); *G06F 8/36* (2013.01); *G06F 9/44* (2013.01)

(58) Field of Classification Search
CPC ..... G06F 8/35; G06F 8/36; G06F 9/44; G06F 9/451
See application file for complete search history.

(56) References Cited

U.S. PATENT DOCUMENTS

| | | | | |
|---|---|---|---|---|
| 5,555,365 | A * | 9/1996 | Selby ................... | G06F 3/0483 715/765 |
| 6,023,271 | A * | 2/2000 | Quaeler-Bock ......... | G06F 9/451 715/866 |
| 2007/0006085 | A1* | 1/2007 | Hennings ............... | G06Q 10/06 715/752 |
| 2007/0250481 | A1* | 10/2007 | Fiedler ....................... | G06F 8/36 |
| 2008/0301628 | A1* | 12/2008 | Lochmann ................ | G06F 8/10 717/107 |
| 2011/0023022 | A1* | 1/2011 | Harper ....................... | G06F 8/36 717/170 |
| 2012/0317504 | A1* | 12/2012 | Patel ........................ | G06F 9/451 715/762 |
| 2013/0185632 | A1* | 7/2013 | Damera-Venkata ......................... | G06F 17/248 715/243 |
| 2013/0262626 | A1* | 10/2013 | Bozek ..................... | H04L 67/10 709/217 |

* cited by examiner

*Primary Examiner* — Ting Z Lee
(74) *Attorney, Agent, or Firm* — Mintz Levin Cohn Ferris Glovsky and Popeo, P.C.

(57) ABSTRACT

An application object framework provides a GUI developer with application object metadata that can be leveraged to design and implement GUI controls in an efficient, standardized, straightforward manner. For example, a smart control interface may be utilized that enables linking of a particular GUI control with a corresponding application object, including linking to the application data and logic, through the use of metadata of the corresponding application object. In this way, validations and GUI logic required by the GUI control may be provided automatically, leaving the GUI developer the freedom to focus on the visual composition, functionality, and other desired aspects of the GUI controls.

12 Claims, 5 Drawing Sheets

SMART CONTROLS FOR USER INTERFACE DESIGN AND IMPLEMENTATION

TECHNICAL FIELD

This description relates to the design and implementation of user interfaces.

BACKGROUND

User interfaces (UIs), such as graphical user interfaces (GUIs), are widely-used and critical components of modern software applications, particularly for cloud-based applications. For example, a GUI often acts as a client that interfaces with a remote application server executing application code, while the application server interfaces with a database to store, access, or manipulate application data.

There are many different approaches for designing and implementing GUIs. In general, these approaches consider various aspects, including visual elements and aesthetic design, as well as functional aspects of how the GUI interacts with both the user and the back-end (server/database). There are a large number of well-known types of GUI components, such as a text box, a drop-down selection menu, a slider bar to select between a range of values, or a pop-up window, to name a few examples.

Many of these components have been standardized to some extent, and large libraries of components exist for the purpose of facilitating the efforts of GUI developers as they develop new or modified GUIs. In theory, GUI developers may select from these libraries of components, and create customized GUIs.

In practice, however, it may be problematic to combine desired components in the context of a desired GUI. Further, it may be problematic to connect desired components in the context of a specific application associated with the GUI, e.g., to define a manner in which each component communicates with the back-end.

Even if successful in addressing the just-referenced problems, the solutions of a particular GUI developer are often non-standard, and/or difficult to communicate to future developers. As a result, it may be difficult to maintain or upgrade GUIs in an efficient manner.

SUMMARY

Techniques are provided for enabling an application object framework that is flexible, efficient, and easy to use, with respect to both developing and implementing GUIs. The application object framework can be implemented directly in the context of a database system, such as an in-memory database system, so as to enable direct access to needed data. The application object framework enables both core and custom actions associated with a potentially large number of application objects, so that software developers do not have to implement such actions individually and repetitively for newly-developed or modified application objects.

In some implementations, the application object framework provides a GUI developer with application object metadata that can be leveraged to design and implement GUI controls in an efficient, standardized, straightforward manner, so that such controls are referred to herein as smart controls. For example, a smart control interface may be utilized that enables linking of a particular GUI control with a corresponding application object, including linking to the application data and logic, through the use of metadata of the corresponding application object. In this way, validations and GUI logic required by the GUI control may be provided automatically, leaving the GUI developer the freedom to focus on the visual composition, functionality, and other desired aspects of the GUI controls.

The details of one or more implementations are set forth in the accompanying drawings and the description below. Other features will be apparent from the description and drawings, and from the claims.

DETAILED DESCRIPTION

Figure 1:
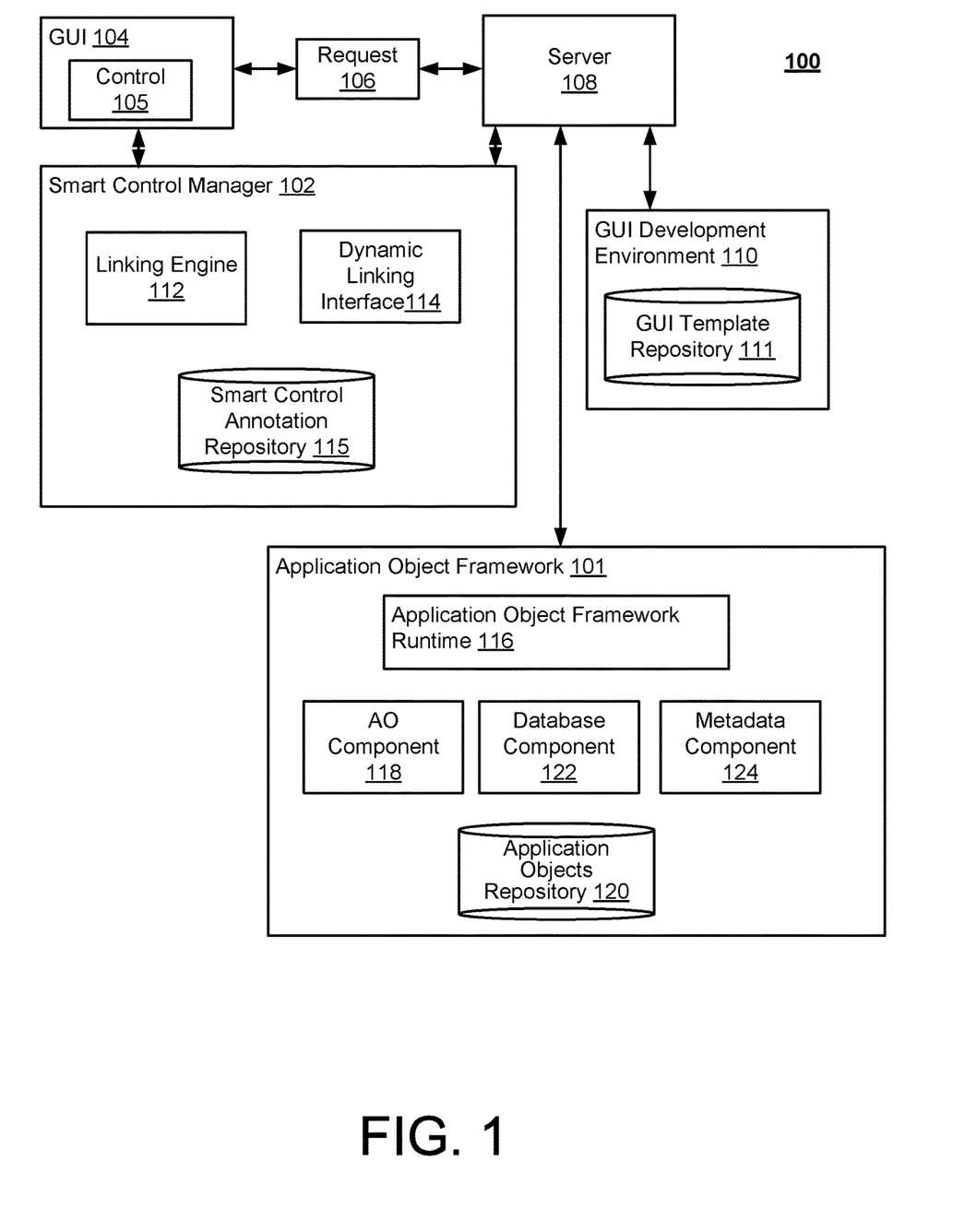
FIG. 1 is a block diagram of a system for user interface design and implementation.

FIG. 1 is a block diagram of a system 100 that includes an application object framework (AOF) 101 utilized by a smart control manager 102 to implement a GUI 104 having a smart control 105. As described in detail, below, the smart control 105 is operable to send a request 106, and to otherwise operate and interact with, a server 108 (and thereby with any associated databases), in a manner that leverages features of the AOF 101. As a result, the GUI 104 may be easily developed, maintained, and updated by one or more software developers within a GUI development environment 110.

In more detail, as shown, the GUI development environment 110 includes a GUI template repository 111. The GUI template repository 111 may include a number of templates for various types of the smart control 105, examples of which are referenced above and provided in more detail, below. In other words, in the example of FIG. 1, the smart control 105 may be understood to represent an instance of a template selected from the GUI template repository 111.

The smart control manager 102 includes a linking engine 112 that may be used, e.g., by a developer using the GUI development environment 110, to link a selected GUI template from the GUI template repository 111 to a particular application object of a plurality of application objects of an application object repository 120. The linking may be implemented using metadata of the particular application object that is available through the AOF 101, to define, instantiate, and/or parameterize the smart control 105, and thereby render the smart control 105 in a desired manner.

During a runtime of the GUI 104, the smart control 105 may be requested by a user of the GUI 104 (e.g., using another control element of the GUI 104, not shown in FIG. 1), and/or the request 106 may be formulated or sent through the use of the smart control 105. A dynamic linking interface 114 may be configured to use the previously-configured annotation(s) of the smart control 105 (and associated metadata) to interface with a linked application object of the application objects repository 120, and thereby render the smart control 106, and implement features and functions thereof.

In the example of FIG. 1, application objects of the application objects repository 120 may contain relevant application data, as well as logic and rules for processing data, or for interfacing with other application objects, or otherwise providing desired software functionality. Such application objects provide a number of known conveniences and advantages with respect to the development and execution of software applications.

In the non-limiting example of FIG. 1, the application object framework 101 includes an application object component 118 that interacts with stored application objects 120, e.g., in conjunction with a database component 122. The database component 122 may be used to provide database management and access features with respect to the application objects 120. Further, a metadata component 124 may be utilized to provide metadata and associated schemas designed to govern runtime operations of corresponding application objects (e.g., or types or instances thereof) in the context of the application object framework runtime 116.

In some implementations, the application objects 120 may be stored in appropriate database tables of a database system, so that the application object data should be accessed in a manner that is appropriate for the database system being used. For example, in some implementations, such a database system may include the high performance analytic appliance ("HANA") system as developed by SAP SE of Waldorf, Germany.

In the specific, non-limiting example of FIG. 1, the application object component 118 may be configured, perhaps in conjunction with the database component 122, to load a specific application object from the application objects 120. The loaded application object may thus be enabled for execution by way of a runtime interface that is provided by the application object framework runtime 116, in conjunction with corresponding metadata obtained from the metadata component 124.

More particularly, for example, the application object component 118 may load a library corresponding to a requested application object, including its definition, structure, attribute, action, checks, or determinations. Metadata obtained from the metadata component 124 may include a corresponding metadata schema that provides information regarding metadata definitions associated with the requested application object. In this way, for example, metadata that may be common to a structure, configuration, or operation of a plurality of application objects may be repeatedly utilized in conjunction with each of a plurality of corresponding application objects when generating a runtime interface in the context of the application object framework runtime 116.

Thus, the AOF 101 enables a software application developer in the context of the system 100 to develop or update a software application (such as a software application that includes, or utilizes, the GUI 104) with a focus on new software features to be provided to the user of the GUI 104. It would be inefficient or infeasible for such a developer to develop software in a manner that requires the developer to create and/or configure basic application and/or network-related functionalities. Accordingly, the application object framework 101 may be designed to provide a software developer with many such basic functions/features, so that the software developer may focus on providing new, specialized features that are specific to the application being developed.

The AOF 101, in general, facilitates points of interface, e.g., between a client and an application server, or between an application server and a database. As the application objects are generally discrete and potentially specific to associated contexts, the AOF 101 creates efficiencies related to using such application objects. For example, the AOF 101 may facilitate repeating a given function or aspect across each of a plurality of application objects, which may lead to efficient development efforts on the part of application object developers. Moreover, the AOF 101 may facilitate interfacing of individual application objects with each other, or with other local or remote software, in a flexible and complete manner.

In a simplified example for the system 100 of FIG. 1, explained in more detail below, an application object may include a sales order within a business software application. The sales order, at the level of the application object, may be associated with related metadata. The sales order application object may be instantiated to obtain a sales order instance, which itself may be associated with additional metadata.

For example, a sales order application object may be associated with metadata characterizing specific fields or data thereof, such as when a field is characterized as describing a maximum (or minimum) order. A particular instance may thus have more particular metadata, such as when the maximum/minimum order is specified in terms of a count of items, or an amount of money. Of course, these are non-limiting examples provided for the sake of explanation and example, and the application object(s) may represent many other business documents, or other documents, or person, role, article, place, or any other item or entity that a software developer may wish to express as an application object.

In the example, then, a software developer may use the GUI development environment 110 to develop the smart control 105, e.g., as a drop-down selection menu. The developer may select a corresponding, generic drop-down selection menu from the GUI template repository 111, and then use the linking engine 112 to add annotations of the smart control annotation repository 115 with respect to the sales order application object and associated metadata. For example, such annotations may parameterize the drop-down selection menu using values that are applicable to the particular sales order (e.g., item counts, or dollar amounts), which might be different from the same types of values for a different sales order (application object). During a runtime of the GUI 104, when the smart control 105 (drop-down selection menu) is requested/selected by a user of the GUI 104, the dynamic linking interface 114 may be configured to retrieve the necessary metadata, using the annotations, and thereby facilitate rendering of the parameterized smart control (drop-down menu) 105.

From a point of view of the user of the GUI 104, the requested/rendered smart control 105 may have the same appearance and function as a similar control element created and rendered using conventional techniques. Nonetheless, from a point of view of the developer of the GUI 104, and of future developers tasked with maintaining or upgrading the GUI 104, design, implementation, and maintenance of the smart control 105 is facilitated and standardized.

For example, the smart control 105 may be rendered in a parameterized fashion on a dynamic, as-needed basis, such as in response to a specific request by the user of the GUI 104. Such dynamic linking may provide a particularly efficient, focused technique for providing the GUI 104, e.g., conserving computing and network resources by rendering only the smart controls that are needed, when they are needed.

Further, the smart control 105 may be updated easily. For example, the annotations may be updated, and/or the corresponding application object and/or associated metadata may be updated (in which case the annotations will simply link to the new data/metadata).

Moreover, in the context of larger design efforts, the GUI 104 may include dozens or hundreds of various types of controls. Using the system 100 of FIG. 1, the GUI developer may develop some or all of these controls using the smart control manager 102, so that the GUI 104 as a whole is easy to design, implement, and maintain, even when different GUI developers are involved.

The smart control manager 105 also enables the creation of various combinations of different (types of) templates from the GUI template repository 111, to obtain more complex types of GUI controls. Some examples are provided below, but in general, it may be appreciated that even such complex controls may be easily designed, implemented, and maintained using the smart control manager 102.

The AOF 101, or any other application framework, may be implemented using a variety of techniques and configurations. For example, although illustrated as a separate, individual component, it will be appreciated that the server 108 may be implemented using one or more servers, which may individually or collectively be utilized to implement the application object framework 101, including, e.g., at least some of the smart control manager 102, the application object framework runtime 116, and/or various other components, as described in detail by way of various non-limiting examples in the following description.

More generally, the various components of the system 100 of FIG. 1 are illustrated as separate, individual, discrete components, sometimes illustrated as being organized as sub-components of a larger component. However, as just referenced, it will be appreciated that any such individual component may represent two or more instances of the same component, and/or may be implemented as two or more sub-components of the illustrated component. Similarly, but conversely, it will be appreciated that two or more sub-components may be combined for implementation as a single component.

Moreover, where two or more instances of a single component may be implemented, it will be appreciated that two or more of the various illustrated components may be implemented in different ones of the multiple instances, and that operations of a single component may be modified or enhanced to reflect interactions with the plurality of instances of each such component. For example, where a plurality of instances of (perhaps different types of) the server 108 are utilized, two or more elements of the smart control manager 102 may be implemented in two or more instances of the different servers.

Finally with respect to the simplified example of FIG. 1, the request 106 is illustrated and described as being received from the client 104. Of course, information and data may also be sent from the server 108 to the client 104, including a response to the request 106. For example, requested data may be sent, or a confirmation of completion of a requested database action may be sent. Such a response may be sent in accordance with, and utilizing, the smart control manager 102 to implement the smart control 105, as described in various examples, below.

Figure 2:
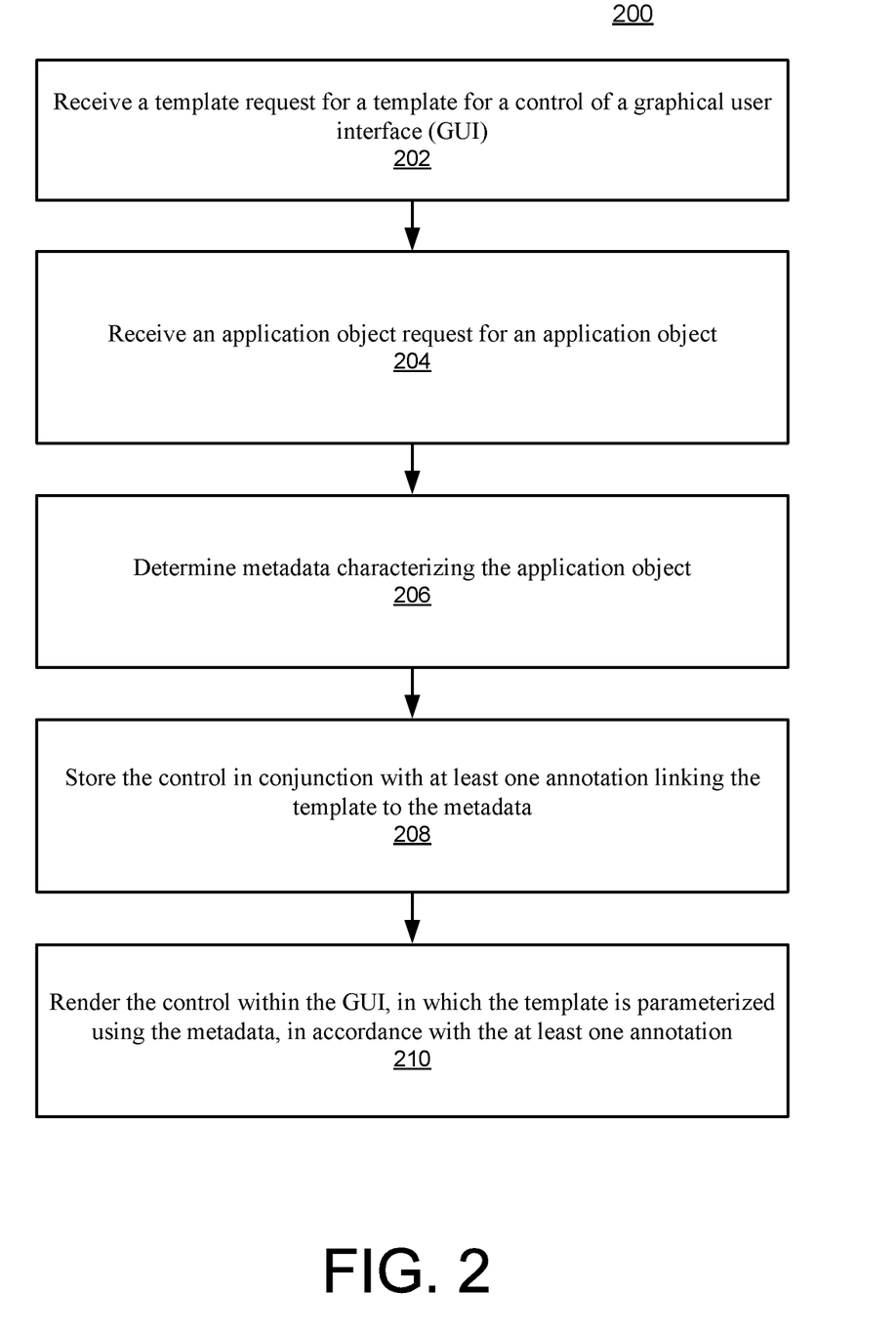
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated as separate, sequential operations. In various additional or alternative implementations, one or more of the operations 202-210, or sub-operations thereof, may be performed in a different order than that illustrated, and/or one or more of the operations or sub-operations may be omitted. Further, any two or more of the various operations or sub-operations may be performed in a partially or completely overlapping or parallel manner, or in a nested, iterative, looped, or branched fashion.

In the example of FIG. 2, a template request for a template for a control of a graphical user interface (GUI) is received (202). For example, a template request may be received from a developer using the GUI development environment 110, with respect to the GUI template repository 111.

An application object request may be received for an application object (204). For example, an application object may be requested from the application objects repository 120. Although the AOF 101 and the development environment 110 are shown separately from the smart control manager 102, it will be appreciated that the smart control manager 102 may be partially or completely implemented together with one or both of the AOF 101 and the development environment 110.

Metadata characterizing the application object may be determined (206). For example, as described herein, metadata may be derived from the application object and associated contextual information, e.g., through the use of the metadata component 124. It is possible metadata may be persisted as such, or may be derived and cached when needed, as described herein.

The control may be stored in conjunction with at least one annotation linking the template to the metadata (208). For example, the linking engine 112 may store the corresponding annotation(s) within the smart control repository 115.

The control may be rendered within the GUI, in which the template is parameterized using the metadata, in accordance with the at least one annotation (210). For example, the dynamic linking interface 114 may be configured to render the control 105 within the GUI 104, parameterized using the metadata specified by the corresponding annotation within the smart control annotation repository 115.

Figure 3:
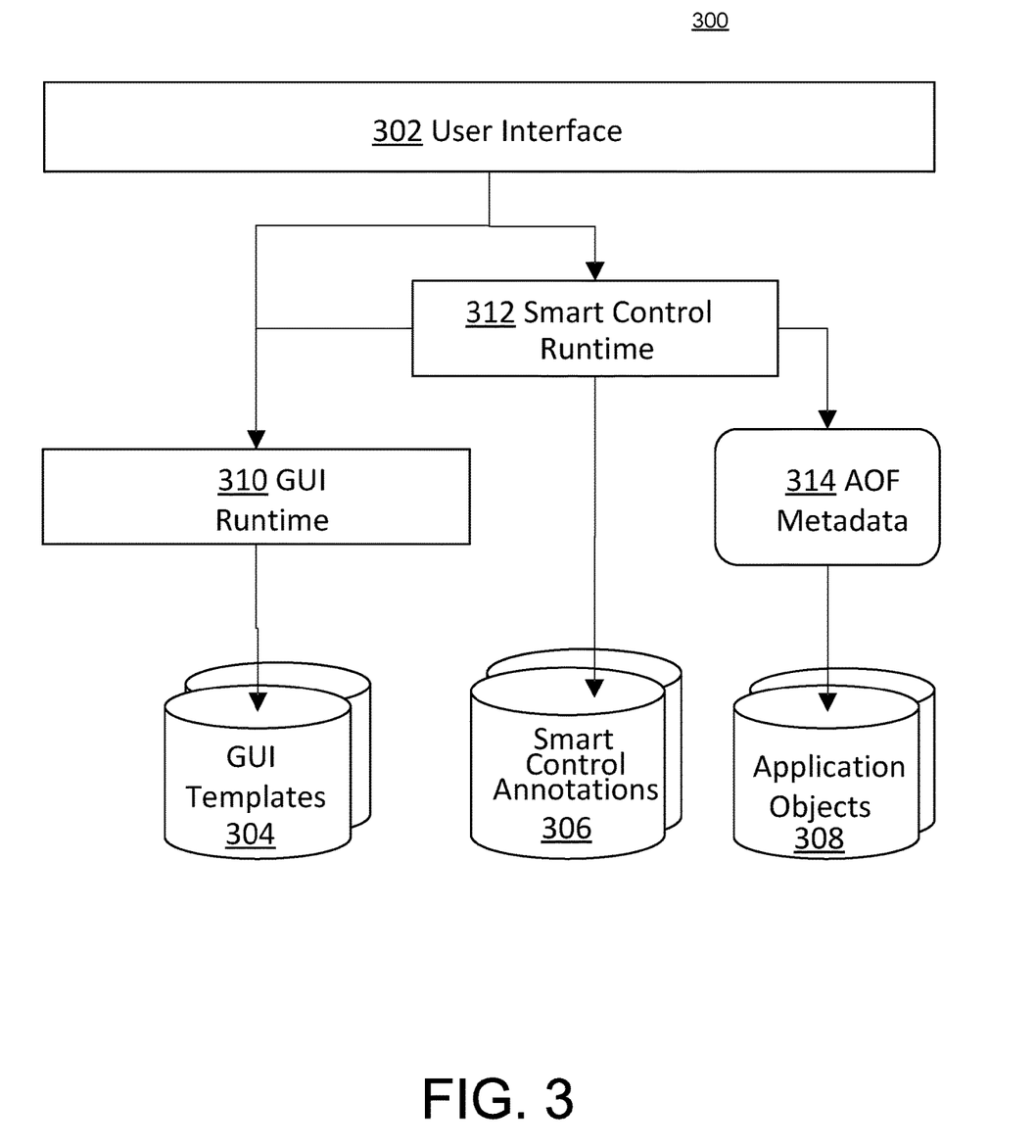
FIG. 3 is a block diagram of a system illustrating an example implementation of the system 100 of FIG. 1.

FIG. 3 is a block diagram of a system 300 illustrating an example implementation of the system 100 of FIG. 1. In the example of FIG. 3, as referenced above, the application object framework 101 is implemented using the HANA system as developed by SAP SE of Waldorf, Germany, or similar or related in memory or main memory database system. For example, the application object framework 101 may be implemented using the HANA platform and associated extended services ("XS") engine. In these and other example scenarios, an appropriate UI development toolkit may be used for a corresponding coding context. For example, for HTML5, a development toolkit and associated library such as SAPUI5 or OpenUI5 may be used.

In some implementations, the application object framework 101 may be implemented and coded using a server-side Java Script language. In related, specific example implementations, the application object framework thus provides a persistency framework for java script/JSON (Java Script Object Notation) objects, e.g., implemented in a runtime environment such as node.js. In such examples, the application object framework thus provides the runtime for an object declaration file to model application objects, e.g., as aggregations of hierarchical nodes mapped to corresponding entities within database tables of the larger database system. Accordingly, application logic of application objects may be described using determinations, checks, and actions to express relevant semantics, while associated metadata/ properties may be used to describe corresponding structural representations.

Thus, in the example of FIG. 3, a client 302 is connected by way of the HTTP protocol to the server 108 (not shown as such within FIG. 3). The application object framework runtime 116 of FIG. 1 may be connected to a corresponding HTTP routing mechanism, e.g., using the "express" module of nodejs. For example, the client 302 may connect to the HTTP server 108 using a URL that addresses a resource on the server's application framework, e.g., a corresponding application object. Dispatching of a request, such as the request 106, may be based on a file extension of the included URL, as well as on a protocol type (e.g., here, HTTP).

As referenced above, and described in detail, below, AOF 101 provides a standardized process by which data is transferred from a UI to the backend, application logic is processed, and data is persisted. As also just referenced, standard protocols, such as HTTP and/or REST, as well as non-standard protocols (e.g., extension protocols), may be used. In FIG. 3, as in FIG. 1, the described smart controls and associated functionalities provide an additional layer of communication, in which the described standardized framework offers, for each application object, metadata information that can be consumed by the user interface 302.

Thus, the system 300 of FIG. 3 allows for composing UI controls freely, while in parallel using support from a smart control API, in order to manage the complexity associated with how those controls are linked to the application data and logic. Consequently, for example, all validations and UI logic may be provided automatically through application object metadata linking, thus leaving the developer the freedom to focus on the visual composition of UI controls.

In more detail, in FIG. 3 and in the following examples, it is assumed for the purposes of illustration and example that application object metadata is structured hierarchically, and available on multiple levels of the hierarchy. For example, at an application object level, root metadata may be made available.

Each object may include one or more nodes, and each node may be associated with one or more attributes. For example, attributes may include a name(s), field(s), or other characterizations of included data or types of data.

Application object metadata also may include one or more associated actions. For example, an object may be associated with a database action, such as a create, read, write, or delete action.

Thus, the metadata includes information about the object itself, as well as metadata that is node-specific. As the application objects are structured as nodes, e.g., a deeply-structured tree of nodes, each node may hold its own metadata information. For example, one level may correspond at a table level, and one level below that may be column information. Each node at the column level may have attributes which map to a table, and these attributes may have metadata as well. The actions may include functionality of the application objects, which may enable execution of status changes, such as enhancing data, or formulating queries. For example, query metadata may enable bringing up a pop-up window to search for a different object, or establish a connection between two objects.

Also in FIG. 3, it is assumed for the sake of example that HTML5 and UI5 are used to structure the user interface 302. Of course, additional or alternative languages and/or development kits may be used.

In the context of HTML5 and UI5, structuring entities may include views or fragments included in GUI templates 304, similar to GUI templates 111 of FIG. 1. Such views or fragments may be expressed declaratively, e.g., using XML notation, to compose arbitrary GUI controls.

In the example of FIG. 3, XML namespace annotations (or other equivalent annotations) may be used to link each control to corresponding object metadata information. Specifically, smart control annotations 306 may be stored that are operable to provide such linking between the GUI templates 302 and a selected level(s) of related metadata of application objects 308.

Put another way, a smart control may be linked to application object metadata information by addressing a path to the application object metadata using annotations. For example, controls may be annotated with custom data in XML view/attribute, as shown in the example of Pseudocode 1:

---
Pseudocode 1

```
<HBox data:aofObject="sap.test.Test" data:aofNode="Root"
data:aofModel="object">
    <Label labelFor="text1" data:aofAttribute="NAME"/>
    <Text id="text1" data:aofAttribute="NAME"/>
</HBox>
```
---

As shown, Pseudocode 1 illustrates an example of a UI5 XML view/fragment snippet, in which a structural element "HBox," is linked to the application object "sap.test.Test" and to the Application Object Node "Root". The UI5 model name is "object". This information may be propagated to all sub-elements of this HBox recursively, so that a need for repeating the information is avoided. If the information is provided again in a deeper element of the hierarchy, it may be overwritten for this element and all sub-elements.

For example, continuing the examples from above, the application object application object "sap.test.Test" may represent a sales order. The element HBox may represent some type of layout container or other control to be parameterized by the metadata of the sales order object.

As also shown in Pseudocode 1, a leaf element contains an annotation (link) to the application object node attribute "NAME". Thus, the following linking path into the metadata may be derived: sap.test.Test.Root.NAME.

In FIG. 3, then, it will be appreciated that a GUI runtime 310 is configured to render the GUI 302, while a smart control runtime 312 provides access to the smart control annotations 306. Finally, an AOF metadata component 314 provides the smart control runtime 312 with access to the application objects 308 and associated metadata. Additional features and functions of the GUI runtime 310, smart control runtime 312, and AOF metadata component 314 are provided in more detail, below, or would be apparent.

In other words, representation of metadata in the GUI 302 operates to provide binding of a control to linked object metadata. Then, in the GUI runtime 310, the relevant annotations are interpreted, and the metadata is used to influence the rendering of the GUI 302, including rendering the correct control(s) with the desired behavior, based on the linked metadata.

Of course, various types of annotations may be used. For example, an annotation aofObject may be used to specify the name of the application object. aofNode may be used to specify the Application Object node, e.g. Root. aofAttribute may be used to specify the Application Object attribute, e.g. NAME.

aofModel may be used to specify the name of the Application Object model in context. For example, aofModel may be set by default, based on context, such as for an Odata read model (specified by "data") and/or an application object instance model (specified by "object").

aofUseValue may be used for an instruction to use an attribute value instead of GUI text. As a final example, aofColon may be used for an instruction to suffix a label using a colon.

The smart control runtime 312 thus enables linking of each control to corresponding field data, including enhancing a static control definition using dynamic linking, according to a field definition in the application object metadata. The smart control runtime 312 may be configured to implement a smart control API, as referenced above, and which may be implemented as: SmartControl.link (oController, oControl, sModelName, sObjectName, sNodeName).

In this example API, a single control may be linked according to the Application Object Node Attribute metadata. Included parameters include oController, a controller holding UI logic, and oControl, a control to be linked as a smart control. sModelName provides a UI5 Model Name of the Application Object or OData model, and can be derived from control annotations. sObjectName specifies an Application Object Name to be linked to, and can be derived from control annotations. sNodeName specifies an Application Object Node Name to be linked to, and also may be derived from control annotations.

Another example API may be specified as: SmartControl.linkAll (oController, oControl, sModelName, sObjectName, sNodeName). In this API, a single control and all its descendant controls may be linked according to the Application Object Node Attribute metadata. The control hierarchy may be traversed recursively, and annotation of the following "aof*"-custom-properties are inherited to descending controls.

Specifically, aofModel specifies a UI5 Model name, aofObject specifies an Application Object Name to be linked, and aofNode specifies an Application Object Node Name to be linked. Parameters include oController, specifying a controller holding the UI logic, and oControl, specifying a control to be linked as a Smart Control. Further parameters include sModelName, sObjectName, and sNodeName, as referenced above.

Thus, for example, an application object name may be used to look up linked metadata and determine a starting node to bind to a corresponding control. For root information, e.g., to display a table, the control may be linked to a subnode having a list of entries into a corresponding subnode class. For labels, an attribute name may be linked to label text, or text of a text field, or a checkbox or other control element. For single value controls, e.g., text and input boxes, the attribute annotation may be specified. For an object node attribute, where the attribute is single multiplicity to one control, a node may be linked to one or a list/table of controls.

The described API(s) enable specifying of models, and thereby specifying of an application object UI5 library exposed as a UI5 model. It may occur that a single application object may have different names, such as different model names for read and write actions. Thus, the standard object names may be derived automatically, while non-standard model names may need to be specified separately.

There may be multiple options for formatting the various bindings or linkings. For example, a label attribute may be linked by a (dynamic) value, not by static text. Then, instead of designating a label by a column, the label attribute may be injected using a metadata description.

Other formatting options may be used. For example, when using XML notation, the smart control API may be called automatically when an XML view or XML fragment is instantiated. Then, these annotations interpret the metadata using binding logic that controls the binding. For example, the binding to one node or another may be dependent on a status of the application object.

The example APIs provided above enable the defining of which controller and control will be linked, specifying, e.g., a model name, node name, and/or control name. In some cases, as referenced, this information may be derived from control annotations.

Pseudocode 2 illustrates an example for smart control usage in the context of an SAP UI5 controller:

Pseudocode 2

```
sap.ui.define([
    "sap/ino/commons/util/SmartControl"
], function (SmartControl) {
    return sap.ui.controller("sap.test.Controller", {
        onInit : function( ) {
        SmartControl.linkAll(this, this.getView( ));
}
    });
});
```

As may be appreciated from the above description, Pseudocode 2 illustrates techniques for the described smart control API to leverage application object metadata configuration information, to dynamically enhance a statically-defined control in accordance with the provided definition.

In Pseudocode 2, a controller function and an initialization function (the oninit function) provide initialization of a controller and view, and a control hierarchy that enables calling the identified smart control and linking it. More specifically, the XML notation enables the API to use the init function to convert the XML notations into bindings against the application objects, whereupon subsequent reading of the application object metadata and interpreting the metadata may be done automatically.

The following features can be reflected on a property level when enhancing the statically defined controls. For example, display controls may include a label, which may be bound against the UI text of the respective Application Object Node Attribute, or a tooltip for each control.

A foreign key reference relationship between two application objects may be established, in which one application object holds the primary key of the other and the name of the referenced key can be displayed (i.e., the name behind the technical foreign key is resolved). This can be done automatically in this control, e.g., by annotating this label with the foreign key attribute, and then, via the metadata, the smart control at runtime detects a foreign key relationship, and automatically reads the name behind this object. This approach also enables linking which allows navigation from one object to the other, so that just by binding against this attribute and using the object name, navigation between the objects is enabled. In case of a link, the navigation to the referenced object may be established as Quick View or by browser navigation.

Also with respect to display controls, text behind code may be resolved and displayed. For example, for a configuration object (such as an authentication object), the configuration may be handled similarly to other types of data (e.g., business data), a reference key of another configuration object may represent code, so that text behind the code may be resolved and a corresponding name may be displayed.

Similarly, a value option list, which is similar to code but not static so more dynamic, may be maintained by a user. That is, whereas the code is static, such a value option list may be changed by a customer or other user. Similarly to the techniques just described, text behind the (user-defined) value options list may be resolved/converted, and displayed, e.g., as labels.

Finally with respect to display controls, a text value(s) can also be bound. That is, a text property of a control may be bound against the relevant value(s).

For modifying controls, more variety may exist for automatic configuration(s) that are derived for the metadata. For example, again a foreign key reference may enable maintaining a link between two objects. Thus, e.g., in a display mode, a referenced object can be selected via a type-head auto-completion input box. The selection may be stored in the referenced application object node attribute value Code text can be selected from a drop-down/select box. The code value may be stored in the referenced value field. Similar comments apply to value options, e.g., text for a corresponding list may be rendered. Upon selection of a value from the code list (similar to a value option list), a drop down box in a search box may be use to select a value option list entry, whereupon the link may be established. In other words, value options text can be selected from a drop-down/select box, where the code value is stored in the referenced value field.

In the application object metadata, some attribute(s) may be marked as required, in which case a corresponding control will also be mandatory (e.g., input is required). For example, a form may be required to be filled out, and it may be checked automatically that this value has been provided (otherwise submission of the form may cancel with an error message). The developer is relieved from defining and specifying these values and performing associated clean up, since these activities may be done automatically, based on setting(s) of an application object property as required in the metadata, which causes the GUI 302 to react accordingly.

The requirement can be a static property like a Boolean true or false, or a dynamic property that is calculated by a function. The requirement may be dependent on the state of the object. E.g., if the object state is a first status, then there is no requirement, but if in a second status, the requirement will be valid, and the GUI will react accordingly.

The selection state of a checkbox may be stored in the Application Object Node Attribute value. Selection state provides an ability to bind an attribute value with a type of Boolean (or with an integer representing 0 or 1), to enable binding the value against a selection state, e.g., of a checkbox or switch.

It is possible to derive a maximum length of an input field, or min/max of an integer field, (e.g., only entered value between 0 and 100 are valid). In other words, the maxLength value or min/max value of a text field may be bound against the corresponding Application Object Node Attribute metadata.

Whether a control is enabled or editable may also be specified. The value property of a control may be bound against the Application Object Node Attribute value. That is, a generic value field may be bound against a value of an attribute that is corresponding to the text field value. Then, everything entered may be bound automatically against the application object attribute, thereby leveraging storage/persistence of the application object data.

The described linking of application object metadata is designed to respect a type of an Application Object Node Attribute. For example, during linking, the correct type is created on the fly, holding and verifying the following information. Specifically, for a type "string," the information includes minLength, and maxLength. For a type "Integer/Float," the information includes minimum, maximum values. For a type "Date/DateTime/Time," a date format may be included. Boolean types may also be used, as already referenced.

Figure 4:
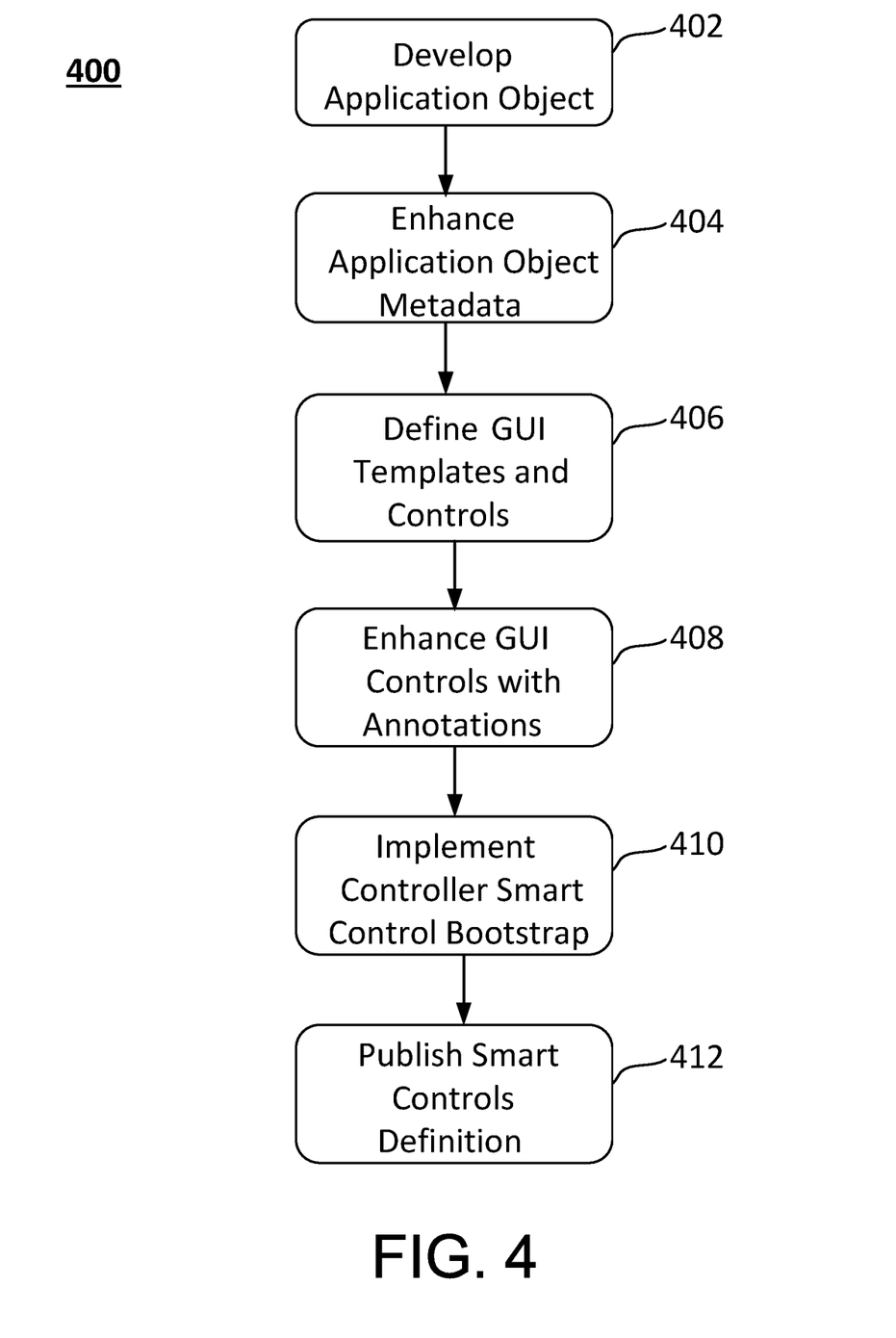
FIG. 4 is a flowchart illustrating example design-related operations associated with the system of FIG. 3.

FIG. 4 is a flowchart illustrating design-related operations associated with operation of the systems of FIGS. 1 and 3. In the example of FIG. 4, application objects are developed (402). E.g., in the application objects 308, application objects are persisted, along with runtime information/data for application object instances. Various techniques exist for creating suitable application objects, details of which are not described here, except as may be necessary or helpful in understanding or explaining the operations of FIGS. 1 and 3.

The application object metadata may be enhanced to reflect desired aspects of smart controls (404). For example, some nodes may be designated read-only, type information on attributes may be enhanced, or application objects may be linked via foreign key relationships. In some implementations, metadata may be derived from persistence of application objects, and not separately persisted. That is, metadata may be derived on the fly and/or generated from application object definitions. This metadata may then be cached and optimized.

GUI templates and controls may be defined and/or selected (406). As already described, such GUI templates should be understood to broadly reference various types of simple or complex controls, or portions thereof, including a control, view, or fragment.

GUI controls may be enhanced with annotations (408). Examples of such enhancements are provided above (e.g., enhancing statically-defined controls). A level of a GUI at which the annotations are added may be specified, e.g., at an object, node, or attribute level. From this information a pointer into the metadata is provided, enabling retrieval of the specified information during runtime.

Thus, in the UI development of FIG. 4, views are outlined and designed for available UI languages (e.g., XML, or JSON), and, e.g., XML definitions are enhanced with corresponding AOF annotations. The annotations provide a name of a corresponding application object, attribute, and/or node, and thereby defines, at runtime and as described below, information pointed to within the AO metadata by the controls, e.g., as described above with respect to Pseudocode 1.

Although as described, the smart control API is called during runtime, it may be advantages to implement a bootstrap strategy (410). That is, to start the smart control API, it may be necessary or helpful to call the link in the corresponding controller code of the UI framework, otherwise the UI framework may be unaware of the smart control concept.

The bootstrap operations enable communication to the UI runtime that a smart control runtime engine will be executed (e.g., the smart control API). For example, one option is a "link all" option, in which definitions have been specified already in the corresponding UI template(s), and then link all, and specify a controller/view with which to start. In another option, instead of using XML, in a fragment, code may be used to enable dynamic smart controls. In these dynamic smart controls, different controls may be linked depending on particular, current control values (e.g., link a first control when the value has value "a," and link a different control when value has value "b."

In some implementations, it is possible to program with smart control concept. For example, static xml may be used to call the "link all" in the API, or calls for specific controls may be done one-by-one. Thus, such link information leverages the annotations from the xml, but enabling adding of additional linking information when you call the API. In other implementations, the "link all" command may be provided, and "link all" may be used to then perform all relevant linkings automatically. In this way, a bootstrap of the smart control runtime may be provided.

Thus, the relevant API that is available during design time for UI developers are basically these two functions, which are called link and 'link all,' and which are available from the relevant smart control library. The linkings may be performed by text editor or graphical editor.

Finally in FIG. 4, smart control definitions may be published (412) to facilitate access to the described features by the runtime environment. For example, if published, the runtime is able to access an activation step to distinguish between local development and actual usable runtime components within the repositories 304, 306, 308. In other words, this type of activation operation designates that the smart controls are ready for use and designated as such within the repositories 304, 306, 308.

In a specific example of the operations of FIG. 4, for a new sales order application object having a root header with two nodes linked together, two nodes may be persisted. Using this root, item node(s), and associated persistence table, metadata may be derived using relevant context information.

For example, in the context of a specific database, and node(s) persisted in database table(s), the metadata runtime component 314 can derive metadata using an object definition. The metadata runtime component determines two nodes that map to a determined database table, as well as attributes the nodes has. For example, the metadata runtime component may determine that a column in a table is not nullable (is required), and also may derive, from this knowledge, the metadata that this node is required. Similar comments would apply to type derivations. Thus, as referenced, an object definition plus context information that can be determined from database(s) or other context will result in metadata runtime information, which may then be used with the complete application object definition to be used during runtime.

Figure 5:
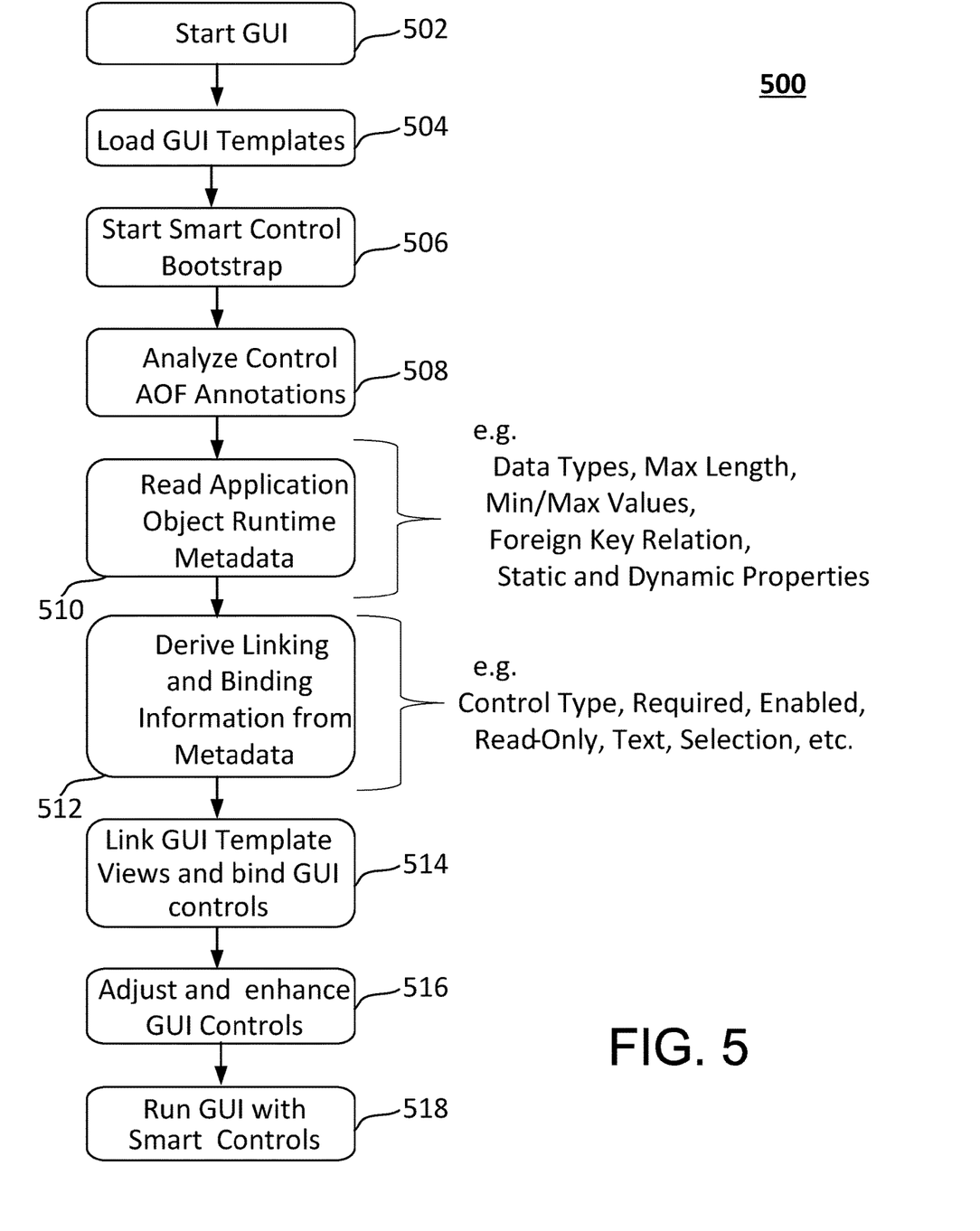
FIG. 5 is a flowchart illustrating example runtime operations of the system of FIG. 3.

FIG. 5 is a flowchart illustrating example runtime operations of the system of FIG. 3. In FIG. 5, the GUI is started (502), and initial GUI templates are loaded (504). As described, the annotated GUI templates are linked to the smart control runtime 312. The templates typically have visual or structural aspect(s), as well as controller aspects that include the operational logic of the GUI.

This controller part(s) will, during initialization, start the smart control runtime 312 as part of a bootstrapping operation (506). For example, as referenced above with respect to operation 410 of FIG. 4, the controller may call a "link all" function on its corresponding GUI template, thereby instructing the template to initiate the linking process.

The smart control runtime 312 may then analyze the loaded templates and all the annotations and associated controls of the templates (508). That is, the controls may or may not contain smart control annotations as described herein.

The smart control runtime 312 may then load all the metadata for the referenced application objects according to the annotations (510). For example, the smart control runtime 312 may make an external, asynchronous call to the backend system to derive necessary information. Examples of such information are provided in conjunction with operation 510 and above, e.g., data types, max length, min/max values, foreign key relationships, structural parts, node relationships, and various other static and dynamic properties.

Then the smart control runtime 312 may derive actual linking and binding information from the retrieved metadata (512). That is, for example, the smart control runtime 312 may analyze each control and determine how to reflect the linking thereof to corresponding metadata. For example, determinations may be made as to a particular control type, whether a control type needs to be changed (e.g., a dropdown box is replaced with a text field). In other examples, a label may be designated as a required field because a textbox needs to be filled out before a corresponding form can be submitted. In other examples, controls may be enabled or disabled, text boxes may be designated as read only (or editable), or default text or selection options may be provided.

The GUI template views may thus be linked, along with binding of the GUI controls (514). For example, after determining appropriate actions to be taken with the controls in operation 512, the smart control runtime 312 may execute changes to the control hierarchy in the templates and the views, so that these changes are actually reflected in the GUI as well as in the smart control runtime 312.

GUI controls may be adjusted and enhanced as needed (516). For example, if a drop down box has code values to be selected, the smart control runtime 312 will modify the controls and enhance the controls, and then provide the controls to the GUI. The GUI then reflects these changes, and renders the changes.

In this way, the GUI may be executed with smart controls (518). In particular, the GUI may be executed in a recursive, iterative, dynamic manner. That is, in addition to the initial GUI operations just described, changes to the GUI from the user may cause these types of operations to execute again with respect thereto. For example, as a user makes a selection in a drop down box of a particular value, the selection may also affect other controls, thereby initiating additional bindings for those controls.

Although the examples are provided above primarily with respect to individual controls, compositions of higher-level controls also may be constructed. Non-limiting examples include: table(s) of Application Objects including filtering and sorting, instance search, displaying an instance, quick View, editing an instance, action handling, draft handling, or analytics for an Application Object.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A non-transitory computer-readable storage medium including instructions which when executed by at least one processor cause operations comprising:
    receiving, from a graphical user interface development system, a template request for a template for a smart control element to be rendered within a graphical user interface, the smart control element linked to annotations stored at a smart control manager, linked to metadata stored at an application object framework, and linked to an application object stored at an in-memory database of the application object framework;
    receiving, at the application object framework, an application object request for the application object stored at the in-memory database of the application object framework;
    determining, at the application object framework, the metadata characterizing the application object;
    storing, at the smart control manager, the smart control element in conjunction with at least the annotations linking the template to the metadata; and
    rendering, at runtime, the smart control element within the graphical user interface, in which the template is parameterized using the metadata in accordance with the annotations, wherein the rendering further comprises interpreting the annotations and deriving at least one value of the application object, the derived at least one value included within the rendered smart control element.

2. The non-transitory computer-readable storage medium of claim 1 further comprising:
    implementing binding logic using the metadata to control binding of the rendered smart control element to the application object.

3. The non-transitory computer-readable storage medium of claim 1, wherein the annotations provide a network path to obtain the metadata.

4. The non-transitory computer-readable storage medium of claim 1, wherein the template is selected from a library of configurable templates stored at the graphical user interface development system.

5. The non-transitory computer-readable storage medium of claim 1, wherein the application object is selected from an application objects repository of the application object framework.

6. The non-transitory computer-readable storage medium of claim 1, wherein the metadata includes at least one of: a data type, a maximum length, a minimum value, a maximum value, a foreign key relationship, a static property, or a dynamic property.

7. The non-transitory computer-readable storage medium of claim 1, wherein the at least one annotation specifies at least one of: a name of the application object, a node of the application object, and an attribute of the application object.

8. A method comprising:
    receiving, from a graphical user interface development system, a template request for a template for a smart control element to be rendered within a graphical user interface, the smart control element linked to annotations stored at a smart control manager, linked to metadata stored at an application object framework, and linked to an application object stored at an in-memory database of the application object framework;
    receiving, at the application object framework, an application object request for the application object stored at the in-memory database of the application object framework;
    determining, at the application object framework, the metadata characterizing the application object;
    storing, at the smart control manager, the smart control element in conjunction with at least the annotations linking the template to the metadata; and
    rendering, at runtime, the smart control element within the graphical user interface, in which the template is parameterized using the metadata in accordance with the annotations, wherein the rendering further comprises interpreting the annotations and deriving at least one value of the application object, the derived at least one value included within the rendered smart control element.

9. The method of claim 8, comprising:
implementing binding logic using the metadata to control binding of the rendered control to the application object.

10. The method of claim 8, wherein the at least one annotation provides a network path to obtain the metadata.

11. The method of claim 8, wherein the template is selected from a library of configurable templates, and the application object is selected from an application objects repository of an application object framework.

12. A system comprising:
at least one processor;
at least one memory including instructions which when executed causes operations comprising:
receiving, from a graphical user interface development system, a template request for a template for a smart control element to be rendered within a graphical user interface, the smart control element linked to annotations stored at a smart control manager, linked to metadata stored at an application object framework, and linked to an application object stored at an in-memory database of the application object framework;
receiving, at the application object framework, an application object request for the application object stored at the in-memory database of the application object framework;
determining, at the application object framework, the metadata characterizing the application object;
storing, at the smart control manager, the smart control element in conjunction with at least the annotations linking the template to the metadata; and
rendering, at runtime, the smart control element within the graphical user interface, in which the template is parameterized using the metadata in accordance with the annotations, wherein the rendering further comprises interpreting the annotations and deriving at least one value of the application object, the derived at least one value included within the rendered smart control element.

* * * * *